Figure 1:
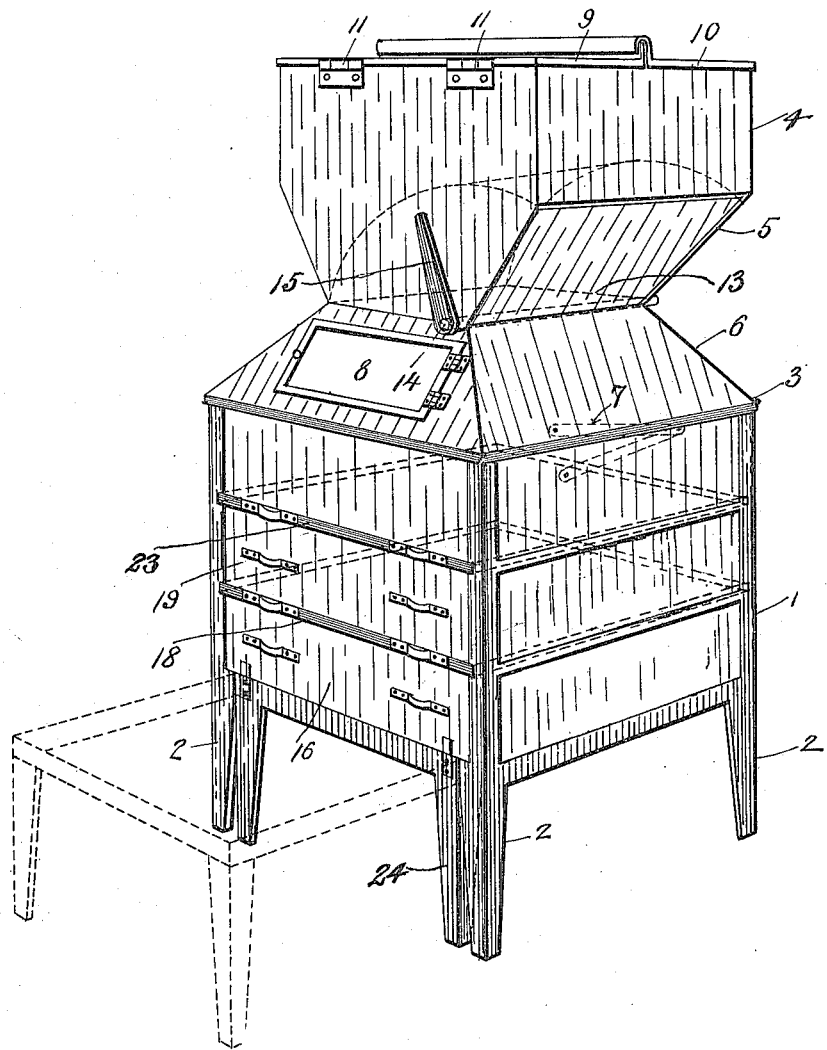

E. PELLS.
MEASURING AND FILLING APPARATUS.
APPLICATION FILED SEPT. 21, 1914.

1,157,896.

Patented Oct. 26, 1915.
2 SHEETS—SHEET 1.

FIG. I.

WITNESSES:
M. C. Lucas
Einar Larson

INVENTOR
Edna Pells

BY
May A. Schmidt
ATTORNEY

E. PELLS.
MEASURING AND FILLING APPARATUS.
APPLICATION FILED SEPT. 21, 1914.
1,157,896.
Patented Oct. 26, 1915.
2 SHEETS—SHEET 2.
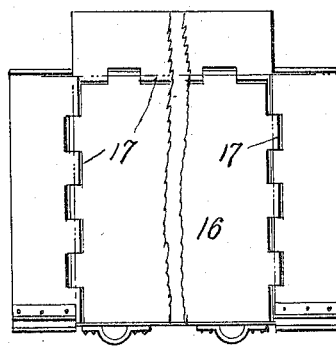
FIG.-2.   FIG.-3.
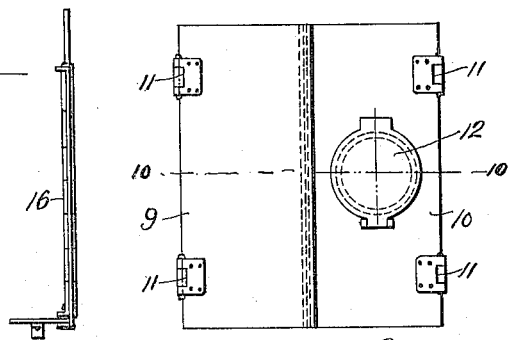
FIG. 9.
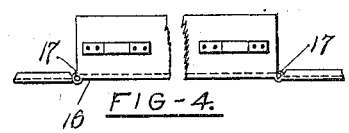
FIG.-4.
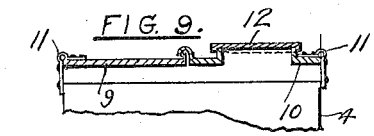
FIG.-10-
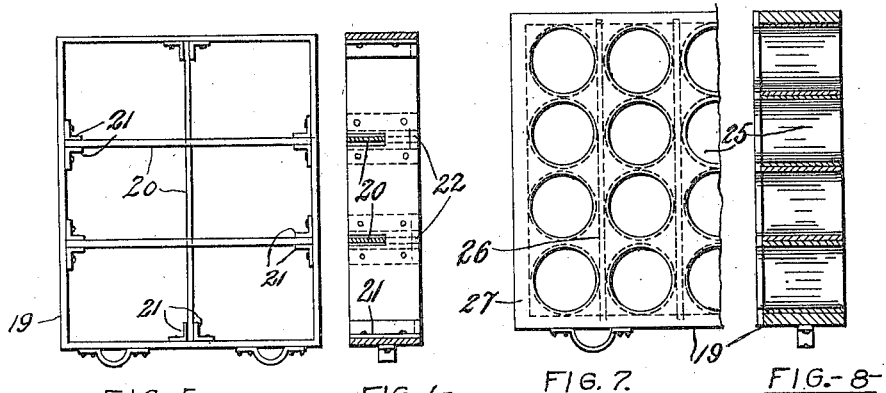
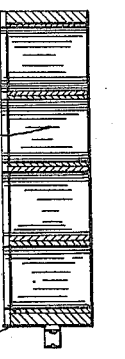
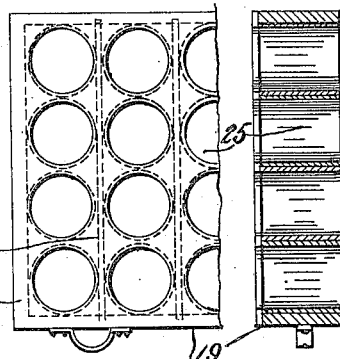
FIG.-5.   FIG.-6.   FIG. 7.   FIG.-8-
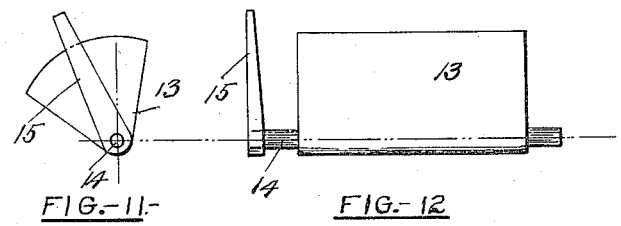
FIG.-11.-   FIG.-12
WITNESSES:
M. C. Lucas
Einar Larson
INVENTOR
Edna Pells
BY
Max A. Schmidt
ATTORNEY

UNITED STATES PATENT OFFICE.

EDNA PELLS, OF GRAND ISLAND, NEBRASKA.

MEASURING AND FILLING APPARATUS.

1,157,896.

Specification of Letters Patent.

Patented Oct. 26, 1915.

Application filed September 21, 1914. Serial No. 862,717.

*To all whom it may concern:*

Be it known that I, EDNA PELLS, a citizen of the United States, residing at Grand Island, in the county of Hall and State of Nebraska, have invented certain new and useful Improvements in Measuring and Filling Apparatus, of which the following is a specification.

This invention relates to apparatus for filling cartons and other receptacles, and its object is to provide a simple and efficient apparatus of this kind which is rapid in operation, and which accurately measures the quantity of material to be placed in the cartons.

The invention also has for its object to provide a structure all parts of which are accessible for cleaning and other purposes.

With these objects in view, the invention consists in a novel combination and arrangement of parts to be hereinafter described and claimed, reference being had to the accompanying drawings, in which—

Figure 1 is a perspective view of the apparatus; Fig. 2 is a plan view, Fig. 3 a side view and Fig. 4 an end view of the carton holder; Fig. 5 is a plan view and Fig. 6 a cross-section of the measuring device; Fig. 7 is a plan view and Fig. 8 a cross-section of a different form of measuring device; Fig. 9 is a plan view of a hopper forming a part of the apparatus; Fig. 10 is a cross-section on the line 10—10 of Fig. 9; Fig. 11 is an end view of a valve or cut-off device, and Fig. 12 is a side elevation of the same.

Referring specifically to the drawings, 1 denotes a cabinet or other suitable housing which incloses the measuring devices and other parts of the apparatus, said cabinet being supported on legs 2. The upper part of the cabinet comprises a top portion 4 having a contracted portion 5 and a flared portion 6 beneath the latter, said part 6 seating on the top of the cabinet and being hinged thereto as indicated at 3. The hinge connection allows the hopper to be swung back to permit access to the interior of the cabinet for cleaning and other purposes. A pivoted brace 7 is provided for holding the hopper when it is swung back. In the part 6 of the hopper is a glass door 8 to permit inspection of the material in the hopper and to observe the quantity of material therein.

The top of the hopper part 4 has a lid which is in two sections, the same being shown at 9 and 10, respectively. The lid sections are hinged to the top edge of the hopper, as indicated at 11, and the meeting edges of the sections have overlapping parts to effect a tight joint. The section 10 has a small opening provided with a closure 12. The material is thrown into the hopper through this opening.

In the hopper, at the junction of the parts 5 and 6 thereof, is a valve or cut-off device 13, the same being carried by a shaft 14 supported in the hopper walls and projecting therefrom, one of the projecting ends of the shaft being provided with an operating handle 15.

In the bottom portion of the cabinet 1 is mounted a slidable drawer 16 which supports the cartons to be filled. This drawer is shown in detail in Figs. 2, 3 and 4. Three of the side walls of the drawer are hinged to the bottom as indicated at 17. The front wall of the drawer is fixed to the bottom. By providing the hinged walls, the same may be swung back as shown in Figs. 2, 3 and 4 to facilitate the removal of the filled cartons. Above the drawer 16 is mounted a slide 18 which, when it is in place, covers the top of said drawer. Above the slide 18 is mounted a measuring device, the same comprising a slidable drawer 19 which is divided into compartments by partitions 20, the number and location of said compartments corresponding to the number and location of the cartons in the drawer 16. The drawer 19 is open at the top and bottom and seats on the slide 18, which latter thus serves as a closure for said bottom. The partitions 20 are removably held between guides 21 on the sides of the drawer 19, and at the bottom of said guides are stops 22 to prevent the partitions from dropping down through the open bottom of the drawer. Above the drawer 19 is mounted a slide 23 which serves as a closure for the top thereof.

The apparatus is operated as follows: The drawers 16 and 19 being in place in the cabinet 1, and the cartons to be filled being in the drawer 16, the material is thrown into the hopper so that it accumulates on the slide 23. The slide 23 is now withdrawn, whereupon the material drops into the measuring compartments in the drawer 19, and when said compartments are filled, the slide 23 is pushed back to cut off the supply of material. The slide 18 is now withdrawn, whereupon the material in the measuring compartments drops into the cartons in the drawer 16. The compartments are dimensioned to measure the exact quantity of material that is to go into the cartons. The slide 18 is next pushed back, and upon pulling the drawer 19 out and replacing the same with a new supply of empty cartons, the operation is repeated.

The apparatus is simple in construction, and easily operated, and as all the parts are readily accessible they can be easily kept clean. The cabinet 1 is provided with an extra set of legs 24 attached similar to the legs of an extension table, and arranged to be drawn out as shown dotted in Fig. 1 to form a support for the drawer 16 when it is withdrawn to remove the filled cartons.

If it is desired to fill round cartons, a series of correspondingly shaped measures 25 are placed in the drawer 19 as shown in Figs. 7 and 8. These measures are carried by partitions 26 which are removably supported in the same manner as the partitions 20. A piece 27 of sheet metal, with openings of the same size as the measures, is placed on top of the latter to prevent the material from dropping between the measures.

I claim:

A measuring and filling apparatus comprising a housing, sliding drawers mounted in the housing in vertically spaced relation, the lower drawer being open at the top and the upper drawer being open at the top and bottom, a slide in the housing between the drawers, said slide covering the open top of the lower drawer and the open bottom of the upper drawer, a slide in the housing above the upper drawer, from which slide the material is discharged into said upper drawer, and removable and interchangeable measuring devices in the upper drawer discharging through the open bottom of said drawer.

In testimony whereof I affix my signature in presence of two witnesses.

EDNA PELLS.

Witnesses:
C. H. GOELLERT,
W. E. DONNER.

Copies of this patent may be obtained for five cents each, by addressing the "Commissioner of Patents, Washington, D. C."